United States Patent

Wiener

[11] Patent Number: 6,050,883
[45] Date of Patent: Apr. 18, 2000

[54] METHOD OF GRINDING THE TEETH OF SPIRAL-TOOTHED BEVEL GEAR WHEELS

[75] Inventor: Dieter Wiener, Ettlingen, Germany

[73] Assignee: Klingelnberg Sohne GmbH, Remscheid, Germany

[21] Appl. No.: 08/945,716

[22] PCT Filed: May 10, 1997

[86] PCT No.: PCT/EP96/02020

§ 371 Date: Nov. 5, 1997

§ 102(e) Date: Nov. 5, 1997

[87] PCT Pub. No.: WO96/35541

PCT Pub. Date: Nov. 14, 1996

[51] Int. Cl.[7] .................................................. B24B 1/00
[52] U.S. Cl. .................................. 451/47; 451/57; 451/5
[58] Field of Search ............................... 451/47, 57, 65, 451/161, 5

[56] References Cited

U.S. PATENT DOCUMENTS

| 3,813,821 | 6/1974 | Takahashi et al. ................. 51/89 |
| 3,890,118 | 6/1975 | Takahashi et al. ................. 51/287 |
| 3,909,990 | 10/1975 | Tersch ................................. 51/287 |
| 4,799,337 | 1/1989 | Kotthaus ............................ 51/287 |
| 5,000,632 | 3/1991 | Stadtfeld .......................... 409/26 |
| 5,116,173 | 5/1992 | Goldrich . | |
| 5,775,975 | 7/1998 | Mizuno et al. ..................... 451/47 |

FOREIGN PATENT DOCUMENTS

| 0374139B1 | 6/1990 | European Pat. Off. . |
| 257 781 A1 | 6/1988 | Germany . |
| 257 782 A1 | 6/1988 | Germany . |
| 195 17 360 | 5/1996 | Germany . |

OTHER PUBLICATIONS

Uber die Schleifbarkeit von sKegelradern mit epizykloidischer Zahnlangslinie, *Konstruktion* 38 (1986) H.3, S. 87–90.
Zyklo–Palloid–Verzahnung, Herstellung von Spiralkegelradern mit geteiltem Messerkopf, Sonderdruck aus getriebe motoren antriebselemente Heft 2/67, Klingelnberg, W. Ferd. Klingelnberg Sohne–Remscheid, p. 3–8.
Das Zyklo–Palloid–Verfahren zur Herstellung sprialverzahnter Kegelrader, Dr.–Ing. R. Seybold, DK 621.914.6 : 621.833.6,p. 1–6.
Die Werkzeuge fur das Zyklo–Palloid–Verfahren in Abhangigkeit vom Anwendungsbereich, Sonderdruck aus TZ für praktische Metallbearbeitung, 67. Jahrgang, Jul. 1973, Heft 7, Seiten 255 bis 260.
Oerlikon Gear Technology, Die Oerlikon–Verzahnungssysteme.

(List continued on next page.)

*Primary Examiner*—Timothy V. Eley
*Assistant Examiner*—Dung Van Nguyen
*Attorney, Agent, or Firm*—McCormick, Paulding & Huber LLP

[57] ABSTRACT

Disclosed is a method of grinding bevel gear teeth in an intermittent indexing process using a single grinding wheel provided with different bevel angles ($\alpha$) to produce the desired grinding wheel radii (R): one flank is machined during grinding in downward generation as far as a first turning point, another flank is produced in upward generation as far as a second turning point, and machine settings are so adjusted in the turning points as to ensure a correct pressure angle and correct flank topography during the generating process, irrespective of the different bevel angles ($\alpha$). The process combines the advantages of the known completing process, by which both flanks can be ground at the same time at the cost of imposing a particular wheel body geometry with conical teeth, with those of the known two-track process for grinding both flanks with a double grinding head, by which various additional correction factors can be introduced to optimize the flank shape for convex and concave flanks.

2 Claims, 5 Drawing Sheets

OTHER PUBLICATIONS

Fachbereichstandard, DK 621.833.2.001.24, Werkzeugmaschinen, Kegelrader, kreisbogenverzahnt, Kurvex–Verfahren, Berechnung, TGL 25 644, p. 1–8.

Zahnrad–Walzfrasmaschinen fur kreisbogenverzahnte Kegelrader (Kurvex–Verfahren), ZFTKK 250×5K, ZFTKK 500×10/1 K, p. 1–27.

Untersuchungen uber die Flankentragfahigkeit von Kegelradgetrieben, Feb. 14, 1970, p. 45–49.

CNC–gesteuerte Spiralkegelrad–Walzscheifmaschine WNC 80, Klingelnberg, p 2–15.

CNC–Controlled Spiral Bevel Gear Grinding Machine WNC 80, Klingelnberg, 2–15 (English translation of CNC–gesteuerte Spiralkegelrad–Walzscheifmaschine WNC 80).

Schleifen bogenverzahnter Kegelrader in der Kleinerienfertigung, Sonderdruck aus der Zeitschrift "Werkstatt und Betrieb", 118 Jahrgang 1985, Heft 10, p. 703–705.

Das Gleason–Verzahnungssystem fur Spiral–Kegelrader, Gleason, p. 4–35.

Gleason Terminology, Gleason Works, p. 12.

Handbook of Bevel and Hypoid Gears, Dr. Hermann J. Stadtfeld, R.I.T., First Edition, p. 35–52 & 243–245.

American Gear Manufacturers Association Technical Paper 89FTM9, 1989.

Konstruktion 38 (1986) H. 3, S. 87–90.

getriebe motoren antriebselemente H. 2/67, Sonderdruck—Zyklo–Palloid–Verzahnung.

METHOD OF GRINDING THE TEETH OF SPIRAL-TOOTHED BEVEL GEAR WHEELS

DESCRIPTION

1. Technical Field

The invention relates to a method of the type recited in the preamble of the claim.

2. Background Art

There are bevel gear teeth which are produced in a continuous indexing process and those which are produced with the two-axis method or intermittent indexing process. Since the demands on the gears in respect to load-bearing capacity, accuracy and quiet running have continuously increased in the past years, special production methods have been created which, in contrast to lapping after hardening, provide fine machining. There are essentially three basic forms of spiral-toothed bevel gears based on the differences in respect of the longitudinal line of tooth:

- a circular arc constituting the longitudinal tooth line,
- an involute constituting the longitudinal tooth line,
- an extended epicycloid constituting the longitudinal tooth line.

The manufacture of bevel gears with a circular arc as the longitudinal tooth line takes place by means of the intermittent indexing process while the manufacture of those with an involute or extended epicycloid as the longitudinal tooth line takes place in the continuous indexing process. Grinding methods using cone-shaped cup wheels have been developed in the past years for the fine machining of bevel gears, even of those having an epicycloidal longitudinal tooth line. Therefore the possibility also exists for grinding bevel gears, whose teeth have been precut with an epicycloidal longitudinal tooth line with circular arc shaped tools.

It is known that with the lead tooth formations for epicycloids and arcs of a circle being created in the course of tooth cutting, the differences between both longitudinal tooth lines are small and with suitable adaptation lie within the area of the overmeasure of fine machining.

Bevel gear teeth which are produced by means of modern continuous indexing methods, such as Spiroflex or Spirac of the Oerlikon company in Zürich, Switzerland, or Zyklo-Palloid of the Klingelnberg company of Hückeswagen, Germany, generally have such extended epicycloids as longitudinal tooth lines. Except for intended deviations, which are used for generating lengthwise tooth crowning, these teeth are congruent in the longitudinal tooth direction, i.e. the convex and concave flanks have the same radii at the tooth center, only with different signs. Single- or multi-thread face cutter heads are used for producing cyclo-palloid gear teeth. With cyclo-palloid gear teeth, the tooth depth is constant over the entire face width. It is known to differentiate between spiral bevel gear wheels with tapering teeth and those with teeth of equal depth. Regarding the profile height in the longitudinal flank direction, it is possible to produce both shapes by means of the above mentioned process, depending on the layout. In contrast thereto it is not possible in connection with the intermittent indexing processes to selectively realize the difference, which essentially relates to the production of the pitch, during production. While for commercial reasons the continuous indexing method is preferred for the involute and cycloid teeth, the production of bevel gears with circular arc gear teeth is only possible by means of the intermittent indexing process. In connection with bevel gears with spiral teeth which have a circular arc in the longitudinal tooth direction, a method of the Gleason company of Rochester, N.Y., USA, is mainly employed.

The system of tooth cutting employed by Oerlikon is based on constant tooth depth and the continuous indexing method. With the Oerlikon tooth cutting methods, the respectively required lengthwise tooth crowning is achieved by a tilted setting of the cutter head (also called "TILT" by one skilled in the art). With the Spiroflex method the ring gear and the pinion are rolled off on the generating plane gear, and with the Spirac method the ring gear is cut in, while the pinion teeth are produced by generation on the cone of the ring gear.

Also with the so-called Kurvex method of the Modul company (see DD Standard TGL 25644 and the company prospectus No. KB 6060/1972, Zahnrad-Wälzfräsmaschinen für kreisbogenverzahnte Kegelräder [Gearwheel Generating Milling Machines for Bevel Gears with Circular Arc Gear Teeth] (Kurvex method), ZFKK 250×5K and ZFKK 500×10/TK, of the VEB Machine Tool Combinate "7. Oktober" [7th of October], Berlin, VEB Gear-Cutting Plant Modul, Karl- Marx-Stadt), which operates with overlapping milling cutters for the inner and outer flanks in the intermittent indexing process and has arcs as the longitudinal tooth shape, the milling radii are of the same size for the concave and convex flanks, except for the desired lengthwise tooth crowning.

Two grinding disks are required for grinding such bevel gears with precut teeth. The grinding disks are formed as cups (cup disks) and are oriented conically (profiled) in the working area. The inner cone for grinding the convex tooth flank and the outer cone for grinding the concave tooth flank again have the same radius in the profile center of the teeth—except for negligible radius differences for creating the desired lengthwise tooth crowning—. If the respective cone is cut in a plane vertically to the cone envelope line in the profile center of the grinding disk, the distance from the profile center to the center of rotation of the grinding disk constitutes the radius of curvature of the cutting ellipse in the profile center (for more details in respect to this see the dissertation of Dr. Wiener "Untersuchungen über die Flankentragfähigkeit von Kegelrad-getrieben" [Test of the Bearing Capacity of the Flanks of Bevel Gears], pages 45 to 49, RWTH Aachen, 1970). Two radii of curvature, Ra and Ri, result, which again must be of the same size, except for the small differences required for producing the desired lengthwise tooth crowning:

$$Ra=Ri,$$

as represented in attached FIG. 1.

Thus, two grinding disks 11, 12 are required for grinding such gears with precut teeth, since in connection with a grinding disk with the same angles for the inner cone and the outer cone $$Ra>Ri$$

always applies, as can be seen from attached FIG. 2.

Bevel gear grinding machines with a dual grinding head have been developed for grinding the hardened teeth of such bevel gears, such as the CNC-controlled spiral bevel wheel generating machine WNC 80 of the Klingelnberg company (see the applicable company prospectus No. 1320). The dual grinding head permits the finish-grinding in the same chucking of the convex and concave tooth flanks of a bevel gear with precut teeth produced continuously by means of a so-called two track method (the geometric conditions in the crown gear for the two track method can be found in the essay "Schleifen bogenverzahnter Kegelräder in der Kleinserienfertigung" [Grinding of Bevel Gears with Circular Arc Gear Teeth in Small Series Production], D. Wiener in the magazine "Werkstatt und Betrieb" [Shop and Factory], FIG. 6, 1985). For this purpose, grinding disks of different diameters are placed in the two grinding spindles of the machine, so that differences in curvature between the convex and concave flanks are produced during grinding. In the same chucking, first the concave flank of a bevel gear is ground with one grinding disk and subsequently the convex flank with the other grinding disk, or vice versa. Because of this, very different corrections on the two flanks are possible, regardless of the other flank. It is possible to always optimally match the size of the lengthwise tooth crowning and thus the length of the contact pattern for traction and thrust independently of each other to the existing operating conditions. The two machine settings differ not only by the different grinding disk diameter, but also at least by different distances between the grinding spindle center and the machine center (the so-called machine eccentricity S which, in accordance with the representation in FIG. 7, is the distance between the center of the generating cradle axis and the center axis of the grinding spindle). It is furthermore possible to superimpose completely different additional corrections on each other to optimize the flank shapes of concave and convex flanks.

However, in order to be able to grind bevel gears with pre-cut teeth with only a single grinding disk, the so-called completing methods have been developed for bevel gears with circular arc gear teeth produced by the intermittent indexing process. These are based on the recognition that it is possible to change the radii of the cutting ellipses (explained above with reference to FIG. 1) in the required sense by changing the generating angles of the grinding disks: by reducing the angle $\alpha_{cv}$ of the outer cone and increasing the angle $\alpha_{cx}$ of the inner cone (see FIG. 2), the desired radii can be set so that Ra=Ri applies again, as shown in attached FIG. 3. Since the pressure angle is changed by changing the angle $\alpha_{cv}$ of the outer cone and the angle $\alpha_{cx}$ of the inner cone, it is necessary to assure by means of other methods that nevertheless the correct pressure angle is created at the tooth flank. A method of compensating the differences in the grinding disk angles in order to create the correct pressure angle consists in tilting the grinding spindle and thus the grinding disk.

This method is applied, for example, in the completing method of Gleason. Another method for compensating the differences in the grinding disk angles in order to achieve the correct pressure angle consists in letting the grinding disk perform additional movements. This method is used, for example, in a completing method of Klingelnberg. However, both the Gleason and the Klingelnberg methods cause a limitation to a particular wheel body geometry with conically extending tooth depth, i.e. the tooth depth increases from the inside to the outside in the linear tooth direction. Since the grinding process with only one disk takes place simultaneously at the convex and the concave flanks, the grinding time is approximately only half as long as with the separate grinding of both flanks with a dual grinding head. Unfortunately, however, the particular advantage of grinding with the dual grinding head, namely that it is possible by means of two grinding disks to optimize both flanks independently of each other, is lost. If, with the completing method, one flank is optimized, the other flank is unavoidably also affected, so that flank optimization becomes difficult. Furthermore, the particular mentioned at the outset, of the teeth produced with the continuous method, which are distinguished by the constant tooth depth over the tooth width, are lost. The advantages of these essentially are:

kinematically exact toothing thus, a relatively simple layout exact adjustability simple corrections.

A method of the type recited in the preamble of claim is known from DD-A 257 781. With this known method, which can be called a semi-completing method, the grinding disk is provided with different cone angles for creating the desired resulting grinding wheel radii for this purpose. During grinding, the one flank is worked during downward generating and the other during upward generating.

During grinding the machine setting is changed by setting an angle of inclination (TILT) of the grinding disk by inclining the grinding disk axis in such a way that the correct pressure angle and the correct flank topography are created. Since the cone angles of the grinding disk, which are different in comparison with the workpiece to be processed, are compensated by an inclination of the axis of the grinding disk, a linear contact in the direction of the tooth depth occurs at the plane gear as well as at the shape-ground ring gear. Although this makes it possible to create any arbitrary linear tooth shape without being limited in the geometric outlay in the same way as with the completing method, and to optimize each flank independently of the other, a feed in the linear direction of the tooth is required on which, in connection with a generating method, it is to superimpose the generating feed, because of which the grinding times are correspondingly increased.

DISCLOSURE OF THE INVENTION

It is the object of the invention to improve a method of the type recited in the preamble of the claim in such a way that not only each flank of a bevel gear toothing can be optimized independently of the other, but that the toothing can also be ground in shorter periods of time.

This object is attained in accordance with the invention by means of the measures recited in the claim.

With the method in accordance with the invention the setting of the machine in the reversing points is provided such, that the angle of inclination of the grinding disk is only simulated or that, alternatively, a different eccentricity and different pressure angles are compensated by generation. By means of this definitely shorter grinding times than with the method of DD-A 257 781 are possible.

BRIEF DESCRIPTION OF THE DRAWINGS

An exemplary embodiment of the invention will be described in detail below, Caking reference to the drawings. Shown are in.

BEST METHOD OF CARRYING OUT THE INVENTION

Figure 1:
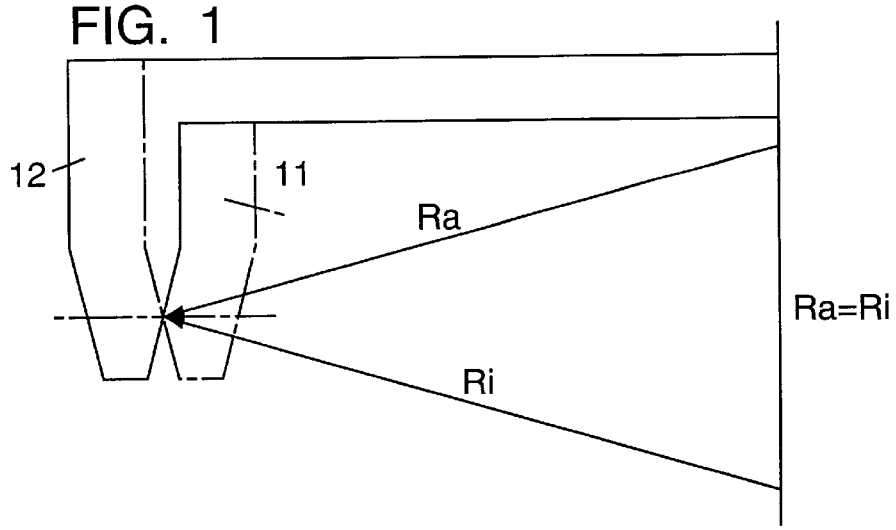
FIG. 1, radii without crowning, required for grinding with two grinding disks.
Figure 2:
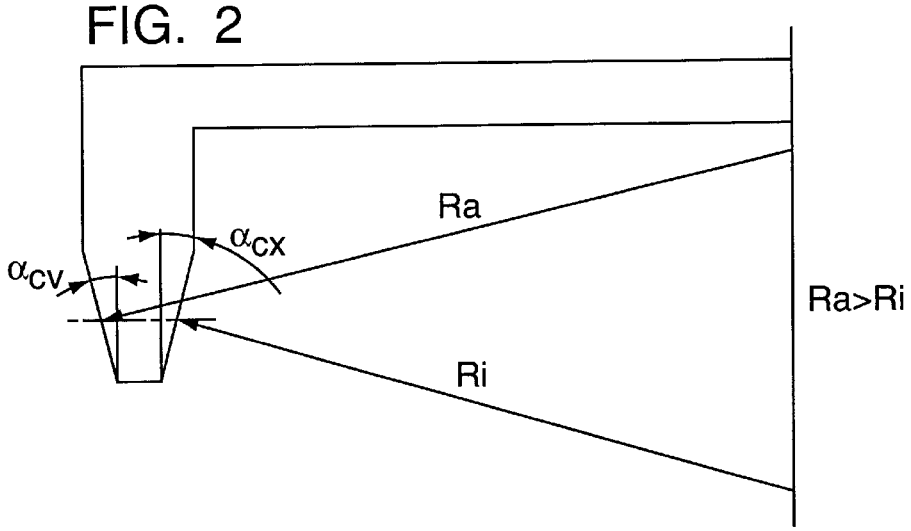
FIG. 2, radii of a conventional grinding disk.
Figure 3:
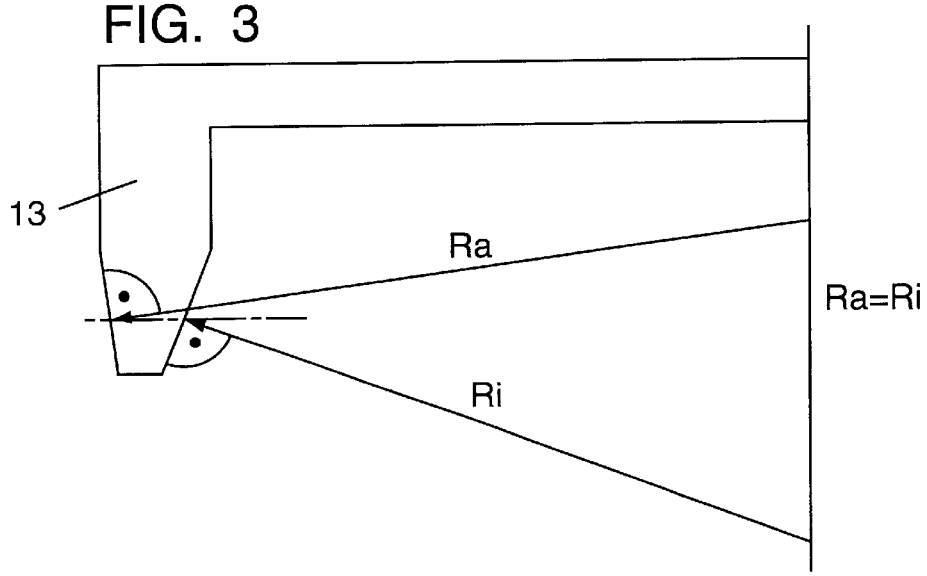
FIG. 3, radii of a grinding disk which can be used with the completing method and with the semi-completing method in accordance with the invention, FIG. 4, grinding of the convex flank of a ring gear by means of the method of the invention, FIG. 5, grinding of the concave flank of the ring gear in FIG. 4 by means of the method of the invention, FIG. 6, a flow diagram representing the algorithm for creating the machine setting for the method of the invention, and FIG. 7, an explanatory representation.
Figure 4:
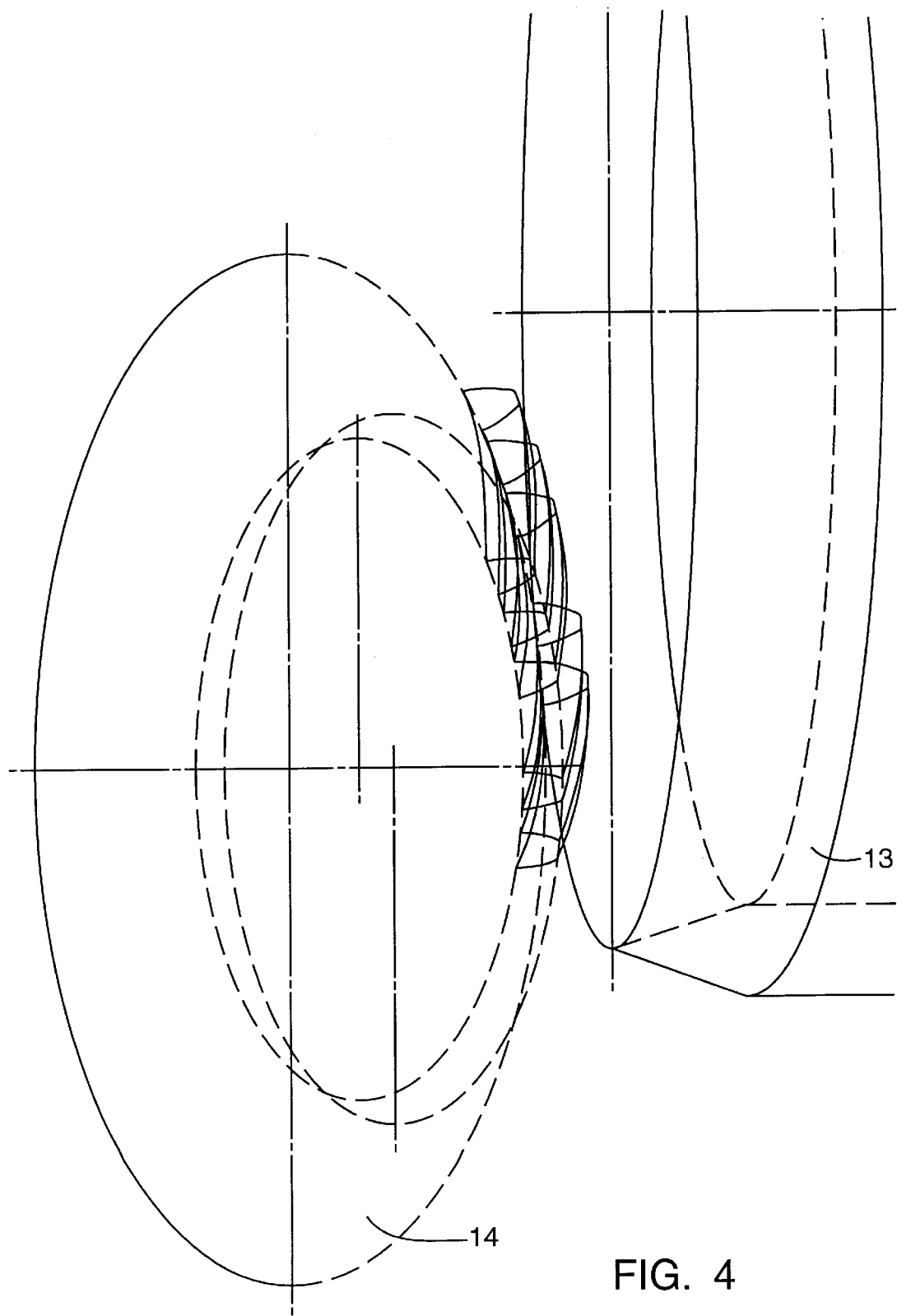
Figure 5:
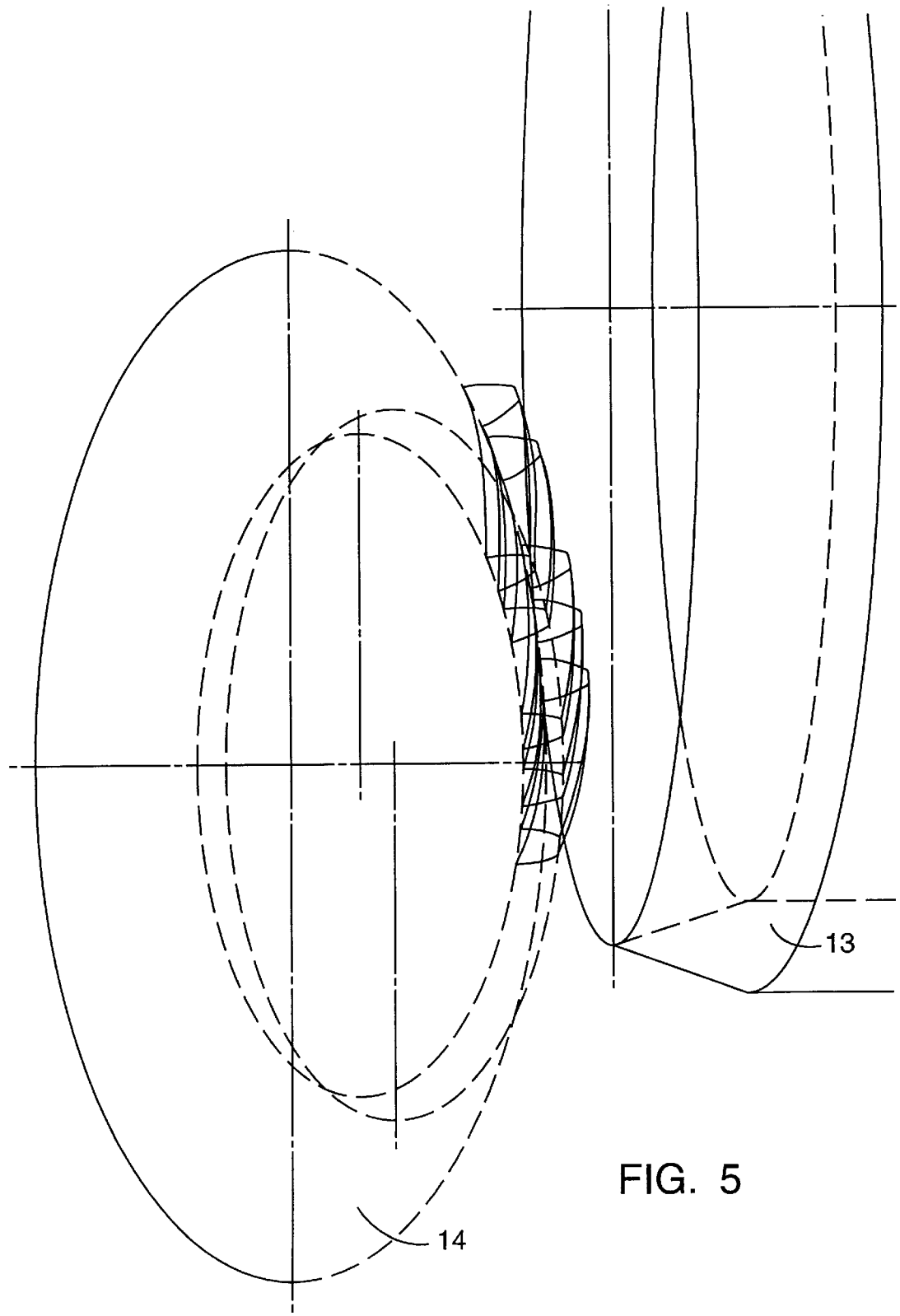

As already mentioned above, FIG. 3 shows a grinding disk known from the so-called completing method, wherein the generating angles of the grinding disks have been changed in that the angle $\alpha_{cv}$ of the outer cone (in respect to the representation in FIG. 2) has been decreased, and the angle $\alpha_{cx}$ of the inner cone (again in respect to the representation in FIG. 2) has been increased, so that $$Ra=Ri$$

applies. In the manner explained above and represented in FIGS. 4 and 5, the convex flank of the helical teeth of a ring gear 14 is worked in one cycle by means of the grinding disk 13 during upward generating (FIG. 4), and the concave flank in another cycle during downward generating (FIG. 5). In the reversing points between downward and upward generating, the machine setting is then changed in such a way that the correct pressure angle and the correct flank topography are created by simulation of an angle of inclination (TILT) of the grinding disk or by an additional movement during generating. The machine eccentricity is also set in such a way that the correct spiral angles are created.

A program is employed for this in actuality, which fixes the appropriate machine settings in the reversing points in such a way, that the correct respective pressure angle is achieved by simulation of an angle of inclination or by means of additional movements during generating, or by a combination of these steps. The algorithm of such a program can be described as follows.

Figure 6:
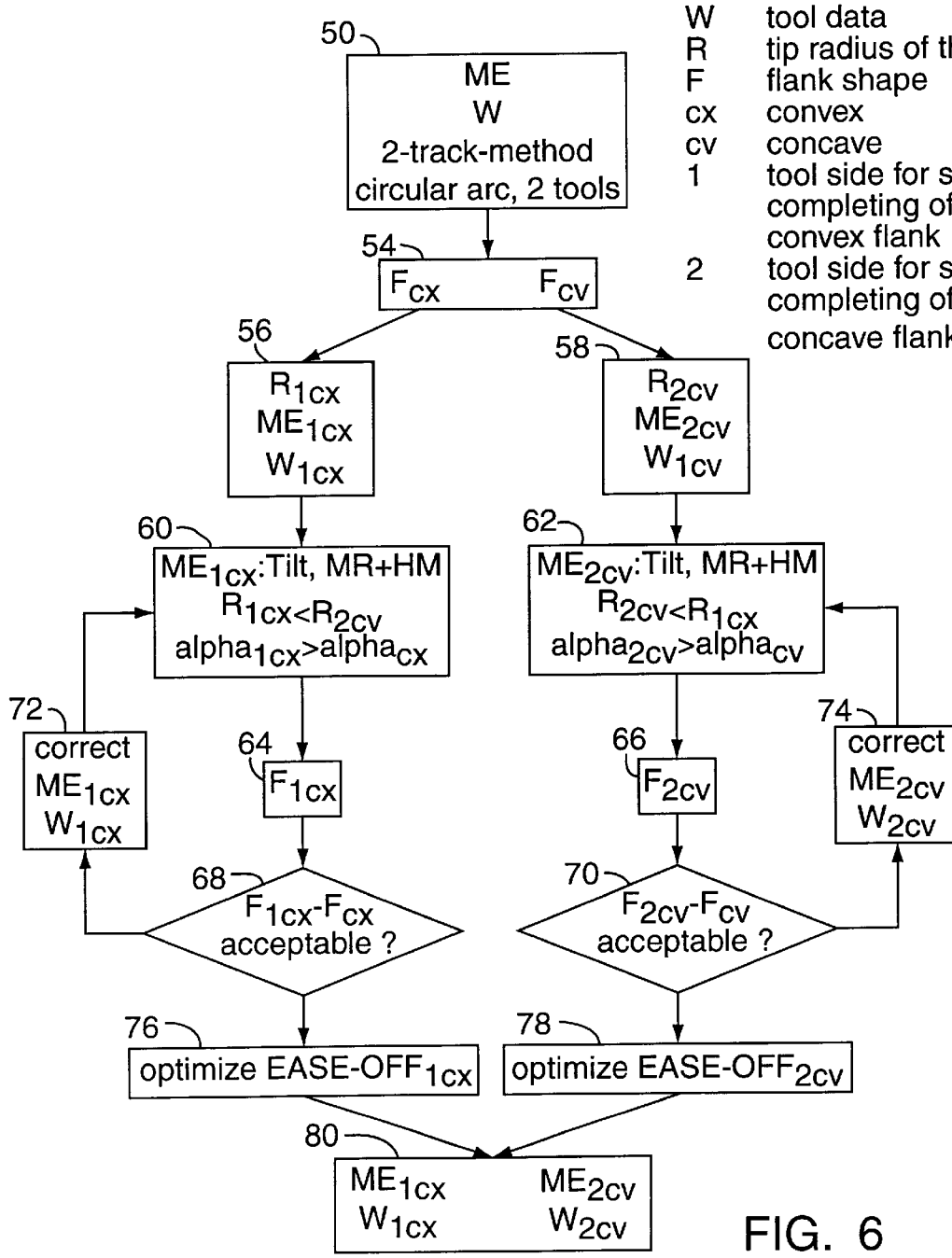

The flow diagram in FIG. 6 represents the algorithm for creating the machine setting for the semi-completing method in accordance with the invention. This is based on the machine setting ME at 50 for two separate grinding disks with the associated tool data W. With the two-track method, this results in a flank shape $F_{cx}$ for the convex and a flank shape $F_{cv}$ for the concave flank (block 54). A tip radius R of the tool, tool data W and the machine setting ME are determined for the respective flank shape, which create a grinding disk which can be physically represented, namely separately, convex ($R_{1cx}$, $W_{1cx}$, $ME_{1cx}$, block 56) for a tool side 1, and concave ($R_{2cv}$, $W_{2cv}$, $ME_{2cv}$, block 58) for a tool side 2. This grinding disk then has a larger tool angle $\alpha_{1cx}$ at the convex flank and at the concave flank a smaller tool angle $\alpha_{2cv}$ than the respective tool angle $\alpha_{cx}$ or $\alpha_{cv}$ of the original grinding disk (blocks 60 and 62, respectively). Furthermore, this grinding disk then has a smaller tip radius $R_{1cx}$ at the convex flank than the corresponding radius $R_{2cv}$, and a greater tip radius $R_{2cv}$ on the concave flank than the corresponding radius $R_{1cx}$.

The incorrect pressure angle at the workpiece resulting therefrom is compensated either by simulation of the inclination angle (TILT) or by superimposition of Modified Roll (MR) and Helical Motion (HM). Modified Roll is a change of the generating ratio between the generating cradle (Y) and the workpiece axis. Helical Motion is a continuous change of the deep infeed (X), see FIG. 7. The setting for semi-completing for both flanks results from this, with an associated flank shape $F_{1cx}$ for the convex flank and $F_{2cv}$ for the concave flank. This flank shape is compared in the flank comparison with the original flank shape $F_{cx}$ or $F_{cv}$ (at 68, 70). If the deviation is too great, the machine setting ME and the tool data W are corrected (blocks 72 and 74, respectively) until the deviation falls within the desired tolerance. After this it is possible, if desired, to optimize each ease-off again in respect to noise behavior and load-bearing ability (blocks 76 and 78, respectively). The results of this are the tool data W for a grinding disk and the machine settings ME for the convex and concave flanks (block 80).

A further variant for fixing the machine settings in the reversing points consists in setting the machine in the reversing points, while maintaining the machine eccentricity and the machine base angle, in such a way that for obtaining the correct pressure angle the different eccentricity and the different engagement during the generating process are compensated by generating. In accordance with FIG. 7, the machine base angle α is the angle between the axis of the generating cradle movement Y and the workpiece axis minus 90°.

Figure 7:
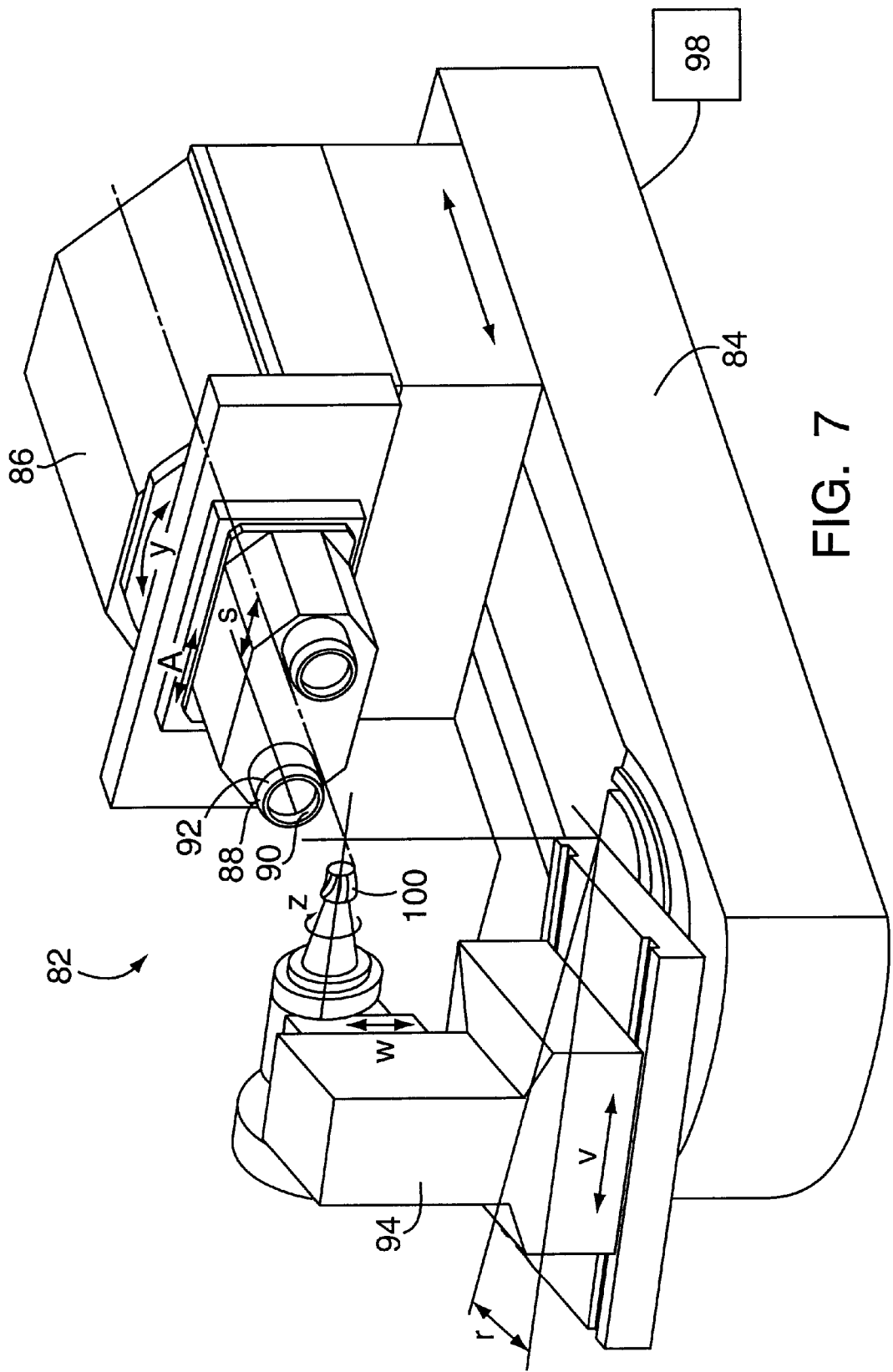

Referring to FIG. 7, a grinding machine generally designated by the reference number 82 includes a frame 84 having a tool carriage 86 mounted thereto for movement back and forth along the frame in a direction indicated by the arrows labeled x. A grinding disk 88 is rotatably mounted to the tool carriage and includes an inner peripheral surface 90 and an outer peripheral surface 92. A workpiece carriage 94 is coupled to the frame 84 adjacent to the tool carriage 86 for movement relative thereto in a direction indicated by the arrows labeled v and w. A controller 98 is in communication with the grinding machine 82 and includes means for storing machine readable grinding data therein A workpiece 100, shown in the illustrated embodiment as a pinion is rotatably mounted to the workpiece carriage.

During operation, the grinding disk 88 is rotated and the tool and workpiece carriage move relative to one another in response to commands issued from the controller 98, thereby causing the inner peripheral surface 90 of the grinding disk to engage the workpiece 100. The grinding disk and workpiece then move relative to one another along a path between a starting point where the grinding disk first engages a gear tooth, and a reversing point at an end of the particular gear tooth opposite the staring point During this motion, the grinding disk grinds the convex gear tooth flank on the workpiece. At the reversing point, at least one of the positions of the workpiece 90 and the grinding disk 88 are adjusted relative to the other via commands issued from the controller. The tool and workpiece carriages are then moved from the reversing back to the starting point, thereby grinding a concave gear tooth flank on the workpiece. The workpiece is then indexed relative to the grinding disk 88 and the process repeated until all of the convex and concave flanks on the gear teeth making up a hypoid or bevel gear are ground.

Finally, the method in accordance with the invention can also be employed for processing pinions with circular arc teeth which have been produced by means of the so-called single side method, wherein the pinions are separately worked on the convex and the concave sides. The single side method is known, for example, from the company pamphlet "Das Gleason-Verfahren für Spiralkegelräder" [The Gleason Method for Spiral Bevel Gears], page 7, Alfred Wentzky & Co., Stuttgart, revised 1942.

I claim:

1. A semi-completing method for grinding spiral bevel and hypoid gears comprising the steps of:

a. providing a grinding machine including; a frame having a tool carriage movably mounted thereto, a grinding disk mounted for rotation to the tool carriage and having an inner and outer peripheral surface, and a workpiece carriage coupled to the frame adjacent to the tool carriage for movement relative thereto;

b. providing a controller in communication with the grinding machine and having machine readable grinding data stored therein;

c. rotatably mounting a workpiece on the workpiece carriage and simultaneously rotating the grinding disk and moving the tool and workpiece carriages relative to one another in response to the grinding data causing the inner peripheral surface of the grinding disk to engage the work piece;

e. moving the tool and workpiece carriages relative to one another in response to the grinding data such that the inner peripheral surface of the grinding disk moves between a starting and a reversing point generating a convex gear tooth flank on the workpiece;

f. adjusting at least one of the workpiece and grinding disk relative to the other in accordance with the grinding data, and moving the tool and workpiece carriages relative to one another from the reversing to the staring point, cutting a concave gear tooth flank on the workpiece; and g. indexing the workpiece relative to the grinding disk and repeating steps a–f until one of said hypoid and bevel gears is formed from the workpiece.

2. A semi-completing method as defined by claim 1 for grinding spiral bevel and hypoid gears wherein:

said inner and outer peripheral surfaces of said grinding disk define first and second flank angles, respectively; and wherein said step of adjusting at least one of the workpiece and grinding disk relative to the other in accordance with the grinding data includes tilting said grinding disk relative to said workpiece in accordance with said grinding data, thereby allowing a desired pressure angle to be established between said outer peripheral surface of said grinding disk and said concave flank.

* * * * *

UNITED STATES PATENT AND TRADEMARK OFFICE
CERTIFICATE OF CORRECTION

PATENT NO. : 6,050,883
DATED : April 18, 2000
INVENTOR(S) : Dieter Wiener

It is certified that error appears in the above-identified patent and that said Letters Patent is hereby corrected as shown below:

Column 4, Line 28: After "it is", insert --necessary--.

Column 4, Line 44: After "below", delete "Caking" and substitute --making--.

Column 6, Line 32: After "therein", insert --.--.

Column 6, Line 43: After "point", insert --.--.

Column 8, Line 1: After "to the", delete "staring" and substitute --starting--.

Signed and Sealed this

Third Day of April, 2001

Attest:

NICHOLAS P. GODICI

*Attesting Officer*   *Acting Director of the United States Patent and Trademark Office*